United States Patent [19]

Delorme

[11] 4,383,536
[45] May 17, 1983

[54] STRAW SPREADER

[76] Inventor: Guy Delorme, Box 307, Willow Bunch, Saskatchewan, Canada, S0H 4K0

[21] Appl. No.: 324,832

[22] Filed: Nov. 25, 1981

[30] Foreign Application Priority Data

Jun. 3, 1981 [CA] Canada ................................. 378929

[51] Int. Cl.³ ...................... A01F 12/56; E01C 19/20; A01D 75/28
[52] U.S. Cl. .................................. 130/27 R; 239/677; 239/673; 56/10.2; 56/503; 56/16.4
[58] Field of Search ...................... 130/27 R, 22 R, 26; 56/503, 500, 10.2, 16.4, 14.6; 239/676, 677, 672, 673; 241/36, 101.7

[56] References Cited

U.S. PATENT DOCUMENTS

| 1,349,152 | 8/1920 | Harn | 239/673 |
| 3,368,214 | 2/1968 | Swanson | 130/27 R |
| 3,563,013 | 2/1971 | Elfes | 56/10.2 |
| 4,137,923 | 2/1979 | Druffel | 130/27 R |
| 4,292,795 | 10/1981 | Linn | 56/503 |

FOREIGN PATENT DOCUMENTS 197804 4/1978 Fed. Rep. of Germany ...... 239/676

Primary Examiner—Robert Peshock
Assistant Examiner—John Weiss
Attorney, Agent, or Firm—Stanley G. Ade

[57] ABSTRACT

Straw spreaders are normally controlled manually by the operator and it is therefore extremely difficult to continually adjust the speed of the spreader so that the straw layer is reasonably even because the density of the straw varies continuously across the average field. The present device includes a rheostat sensor at the straw walker that controls the speed of the orbital motor driving the spreader blade assemblies. This results in a relatively even spread of straw taking place regardless of the variation in straw density as the motor slows down under a light load and speeds up when heavy straw is encountered. The operator can, of course, control the on/off functions from the cab if, for example, it is desired to spread alternate swaths.

16 Claims, 4 Drawing Figures

STRAW SPREADER

BACKGROUND OF THE INVENTION

This invention relates to new and useful improvements in straw spreader assemblies normally situated at the straw discharge end of a combine, harvester or the like.

Conventionally, such spreaders are mechanically driven from the harvester with occasionally mechanical means being provided so that the operator can vary the speed of the spreaders within limits.

It will be appreciated that when harvesting, the density of the straw varies considerably due to the density of the swath and that in any particular field, it is difficult to obtain a relative even spread of straw which is desirable.

SUMMARY OF THE INVENTION

The present device overcomes these disadvantages by providing a monitor which varies the speed of the spreaders automatically depending upon the density of straw passing the monitor. For example, when a relatively light stand is reached, the spreaders slow down so that the straw is not distributed over a large area and as the density of straw increases, the speed of the motor automatically increases to compensate thus spreading the straw over a wider area and tending to maintain a much more even layer of straw.

The operator, of course, can control the on/off characteristics of the straw spreader by means of a switch in the cab so that, for example, the straw may be spread from alternate swaths if desired.

In accordance with the invention there is provided a straw spreader assembly for use with a combine, thresher, or the like which include straw discharge devices such as straw walkers; comprising in combination straw spreader means situated in the path of the discharging straw, means to drive said straw spreader means and means cooperating with the straw discharge device to monitor the amount of straw being discharged by said device, said means cooperating with the straw discharge device being operatively connected to said means to drive said straw spreader means to vary the speed of said straw spreader means depending upon the amount of straw being discharged, thereby maintaining a substantially even layer of straw being spread.

Another advantage of the present invention is the variation of speed of the straw spreaders available by driving same with a hydraulic motor rather than by mechanical belts operatively connecting to the mechanical operation of the harvester machine.

Yet another advantage of the invention is that it is readily installed upon conventional machines such as combines and the like where it may monitor the straw passing over the straw discharge device such as straw walkers and the like.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
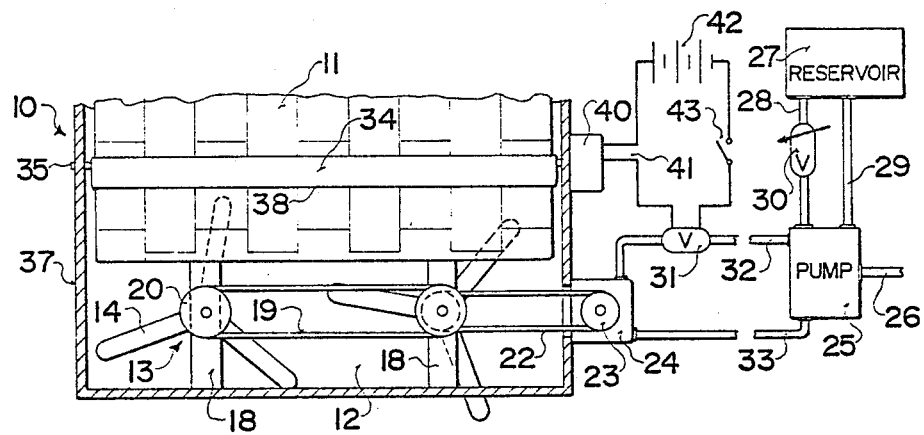
FIG. 1 is a partially schematic top plan view of the rear end of a combine or harvesting device with the invention installed therein.
Figure 2:
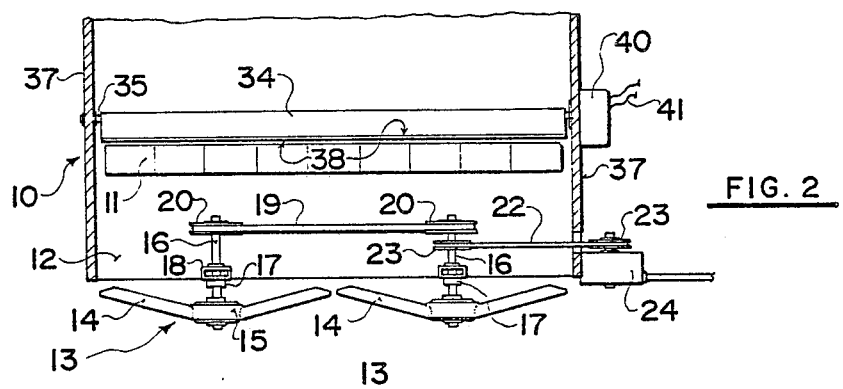
FIG. 2 is a partially schematic rear elevation of FIG. 1.

Although the device is shown attached at the rear of the harvesting device collectively designated 10 which includes straw walker assemblies shown schematically by reference character 11, nevertheless it will be appreciated that it can be incorporated with any harvesting device in which the straw discharge passes over a table or platform so that the density thereof may be gauged mechanically or electrically.

In the present device, the straw walkers 11 are situated adjacent the rear of the combine and discharge the straw into the discharge area 12 whereupon it is deposited downwardly, upon the ground or in the present instance, upon straw spreader blade assemblies collectively designated 13. These straw spreader blade assemblies are substantially conventional inasmuch as they include a plurality of blades 14 secured to hub 15 mounted upon the lower end of vertical shaft 16 supported within bearings 17 by means of braces 18 extending across the discharge area 12. The drive, in this embodiment, is by V-belt 19 extending around V-pulleys 20 secured to the upper ends of shafts 16 and by a drive pulley 21 and V-belt 22, extending to a further pulley 23 driven by a hydraulic orbital motor 24 which is secured to the side of the rear of the combine in a convenient location and by conventional means (not illustrated).

A hydraulic pump 25 is operated by a source of power (not illustrated) through input shaft 26 and oil is picked up from reservoir 27 via line 28 to the pump with the return line being shown by reference character 29. A variable control valve 30 is provided and as all of this particular structure is conventional, it is not believed necessary to describe same further.

A hydraulic flow control valve 31 is situated in the line or conduit 32 extending from the pump to the orbital motor 24 with line or conduit 33 being the return line to the pump 25 and by varying the hydraulic flow control valve 31, the speed of the hydraulic or orbital motor 24 is varied and hence varies the speed of rotation of the straw spreaders 13.

Figure 3:
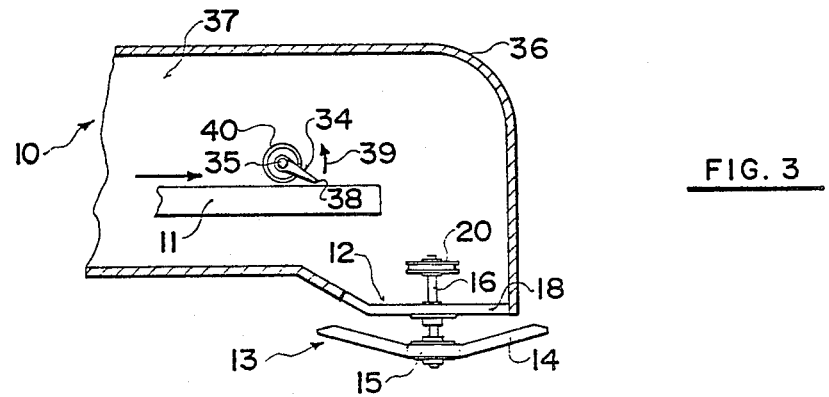
FIG. 3 is a fragmentary side elevation showing one embodiment of the mechanical portion of the straw density monitor.

Means are provided which cooperate with the straw discharge device such as straw walkers 11, in order to monitor the amount of straw being discharged by these devices and one example is shown in the present application. It consists of a transversely extending baffle plate 34 mounted upon a pivot shaft 35 and extending transversely across the width of the combine discharge hood 36 to be mounted within bearings (not illustrated) in the side panels 37 thereof and it will be noted, by reference to FIG. 3, that the pivot shaft 35 is situated adjacent the upper or leading edge of the baffle which is substantially rectangular when viewed in plan. The trailing edge 38 of the baffle rests by gravity upon the upper surface of the straw walkers 11 or the equivalent straw discharge device and as straw passes over the straw walkers, it lifts the trailing edge upwardly in the direction of arrow 39 an amount equal to the thickness of the straw and of course this distance varies with the variation in thickness of the straw.

The pivot shaft 35 is connected to a hydraulic flow control valve 40 at one end thereof and this hydraulic valve is operatively connected by means of electrical wires 41, to the electrical control valve 31 via battery 42 and main switch 43.

It will therefore be appreciated that the hydraulic flow control valve 40 controls the speed of rotation of the hydraulic motor 24 which in turn controls the speed of rotation of the spreader assemblies 13.

The hydraulic flow control valve is so connected that as the baffle 34 rises in the direction of arrow 39 due to an increase in straw density passing over the straw walkers 11, the valve 31 causes the motor 24 to speed up thus increasing the speed of rotation of the spreader assemblies 13 and distributing the heavier stand of straw over a wider area.

Conversely, as the density of straw may decrease over the straw walkers, the baffle 34 falls by gravity towards the surface thereof thus decreasing the speed of motor 24 and slowing down the speed of rotation of the straw walker assemblies 11 so that the straw is not distributed over such a wide area thereby assisting in maintaining a relatively level distribution of straw behind the machine.

The main switch 43 may be located within the cab of the combine or harvesting device so that the operator can cut out the operation of the straw spreader assemblies 13 if desired.

Figure 4:
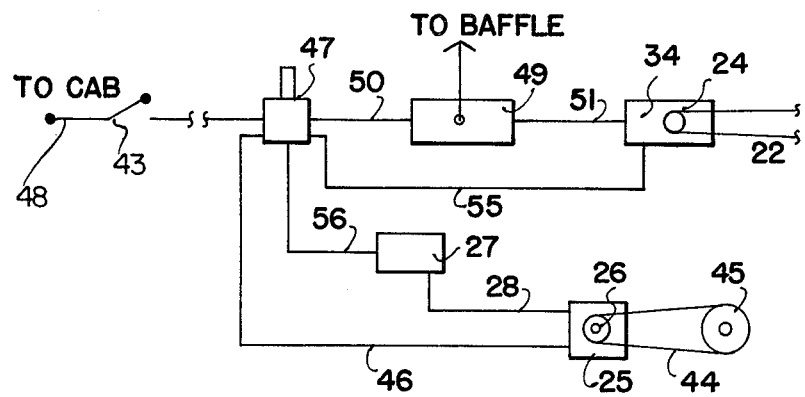
FIG. 4 is a schematic view of the preferred embodiment of the speed control means.

FIG. 4 shows the preferred embodiment of the speed control means and includes the pump 25 with drive 26 being connected by V-belt 44 driven by pulley 45 which may be operatively connected to the source of power in the harvesting device 10. An inlet line 28 connects the reservoir 27 to the pump 25 and an outlet line or conduit 46 extends from pump 25 to an electrical solenoid control valve 47 with an electrical cable 48 extending to the cab and incorporating switch 43 therein. A flow control valve 49 is operatively connected to the pivotal support 35 of the baffle 34 and is actuated thereby. Fluid under pressure flows through the electrical solenoid control valve provided switch 43 is closed, to the flow control valve via conduit 50 and from the flow control valve via the pressure line 51, to the orbital motor 24 with the return fluid passing through return line 55, to the solenoid control valve 47 and thence via the return line 56, to the reservoir.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A straw spreader assembly for use with a combine, thresher or the like which include straw discharge devices such as straw walkers; comprising in combination straw spreader means situated in the path of the discharging straw, means to drive said straw spreader means and means cooperating with the straw discharge device to monitor the amount of straw being discharged by said device, said means cooperating with the straw discharge device being operatively connected to said means to drive said straw spreader means to vary the speed of said straw spreader means depending upon the amount of straw being discharged, thereby maintaining a substantially even layer of straw being spread.

2. The invention according to claim 1 in which said means to drive said straw spreader means includes a hydraulic motor operatively connected to said straw spreader means and hydraulic pump means operatively connected to said hydraulic motor.

3. The invention according to claim 1 in which said straw spreader means includes at least one rotating spreader blade assembly mounted upon the combine, thresher or the like in the path of the straw being discharged thereby.

4. The invention according to claim 2 in which said straw spreader means includes at least one rotating spreader blade assembly mounted upon the combine, thresher or the like in the path of the straw being discharged thereby.

5. The invention according to claim 1 in which said means cooperating with the straw discharge device includes a mechanical gauging device across the path of the discharge device, and hydraulic control means operated by said gauging device, said hydraulic control means being operatively connected to said means to drive said straw spreader means to vary the speed thereof.

6. The invention according to claim 2 in which said means cooperating with the straw discharge device includes a mechanical gauging device across the path of the discharge device, and hydraulic control means operated by said gauging device, said hydraulic control means being operatively connected to said hydraulic motor to vary the speed thereof.

7. The invention according to claim 3 in which said means cooperating with the straw discharge device includes a mechanical gauging device across the path of the discharge device, and hydraulic control means operated by said gauging device, said hydraulic control means being operatively connected to said hydraulic motor to vary the speed thereof.

8. The invention according to claim 4 in which said means cooperating with the straw discharge device includes a mechanical gauging device across the path of the discharge device, and hydraulic control means operated by said gauging device, said hydraulic control means being operatively connected to said hydraulic motor to vary the speed thereof.

9. The invention according to claim 6 in which said hydraulic control means includes an electrically operated hydraulic valve operatively connected to said hydraulic motor.

10. The invention according to claim 8 in which said hydraulic control means includes an electrically operated hydraulic valve operatively connected to said hydraulic motor.

11. The invention according to claims 5 or 7 in which, said mechanical gauging device includes a baffle extending transversely across said discharge device and being pivotally supported by the leading edge thereof, the straw passing under said baffle and partially rotating same around the pivotal support thereof, and an hydraulic flow control valve operatively connected to said pivotal support for operation thereby and being operatively connected to said means to drive said straw spreader means.

12. The invention according to claims 6, 8 or 9 which, said mechanical gauging device includes a baffle extending transversely across said discharge device and being pivotally supported by the leading edge thereof, the straw passing under said baffle and partially rotating same around the pivotal support thereof, and an hydraulic flow control valve operatively connected to said pivotal support for operation thereby and being operatively connected to said hydraulic valve.

13. The invention according to claim 10 in which, said mechanical gauging device includes a baffle extending transversely across said discharge device and being pivotally supported by the leading edge thereof, the straw passing under said baffle and partially rotating same around the pivotal support thereof, and an hydraulic flow control valve operatively connected to said pivotal support for operation thereby and being operatively connected to said hydraulic valve.

14. The invention according to claim 2 in which said means cooperating with the straw discharge device includes a mechanical gauging device across the path of the discharge device, and a flow control valve operated by said gauging device, said flow control valve being operatively connected to said means to drive said straw spreader means to vary the speed thereof.

15. The invention according to claim 4 which includes an electrically operated solenoid control valve operatively connected between said pump and said flow control valve to selectively control the operation of said flow control valve.

16. The invention according to claims 14 or 15 in which said mechanical gauging device includes a baffle extending transversely across said discharge device and being pivotally supported by the leading edge thereof, the straw passing under said baffle and partially rotating same around the pivotal support thereof, said pivotal support being operatively connected to said flow control valve for operating same.

* * * * *